(No Model.) 4 Sheets—Sheet 1.
B. G. SEVERANCE.
CORN OR CANE CUTTER AND BUNCHER.

No. 419,719. Patented Jan. 21, 1890.

WITNESSES. INVENTOR.

(No Model.) 4 Sheets—Sheet 3.

B. G. SEVERANCE.
CORN OR CANE CUTTER AND BUNCHER.

No. 419,719. Patented Jan. 21, 1890.

WITNESSES. INVENTOR.
C. W. H. Brown, Benjamin G. Severance,
T. W. Wood, by E. W. Bradford,
ATTORNEYS.

(No Model.) 4 Sheets—Sheet 4.
B. G. SEVERANCE.
CORN OR CANE CUTTER AND BUNCHER.
No. 419,719. Patented Jan. 21, 1890.
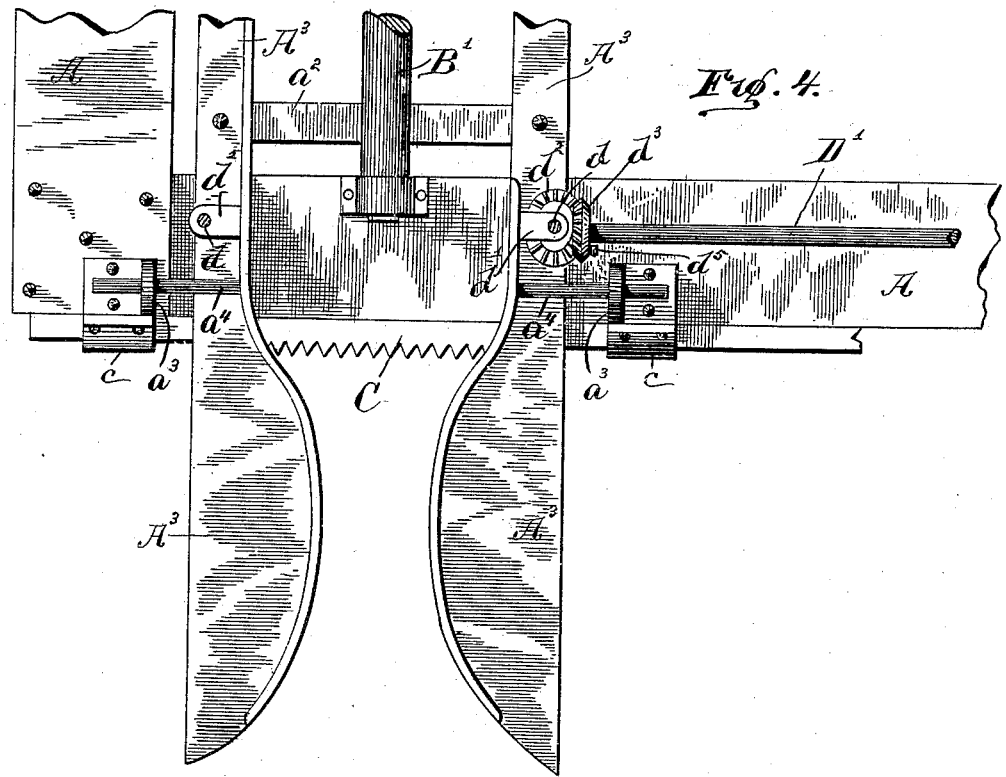
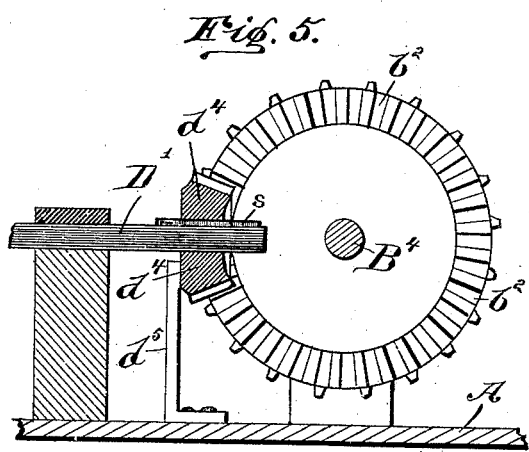
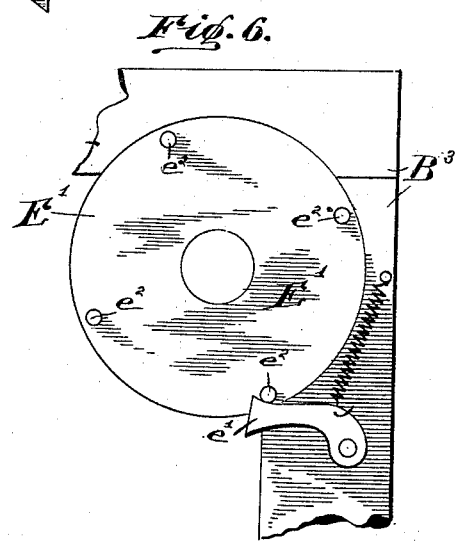

UNITED STATES PATENT OFFICE.

BENJAMIN G. SEVERANCE, OF SALEM, INDIANA.

CORN AND CANE CUTTER AND BUNCHER.

SPECIFICATION forming part of Letters Patent No. 419,719, dated January 21, 1890.

Application filed July 2, 1888. Serial No. 278,807. (No model.)

*To all whom it may concern:*

Be it known that I, BENJAMIN G. SEVERANCE, a citizen of the United States, residing in Salem township, in the county of Pulaski and State of Indiana, have invented certain new and useful Improvements in Corn and Cane Cutters and Bunchers, of which the following is a specification.

The object of my said invention is to provide a cheap and simple machine for cutting and bunching corn, cane, and similar products, as will be hereinafter more particularly described and claimed.

Figure 1:
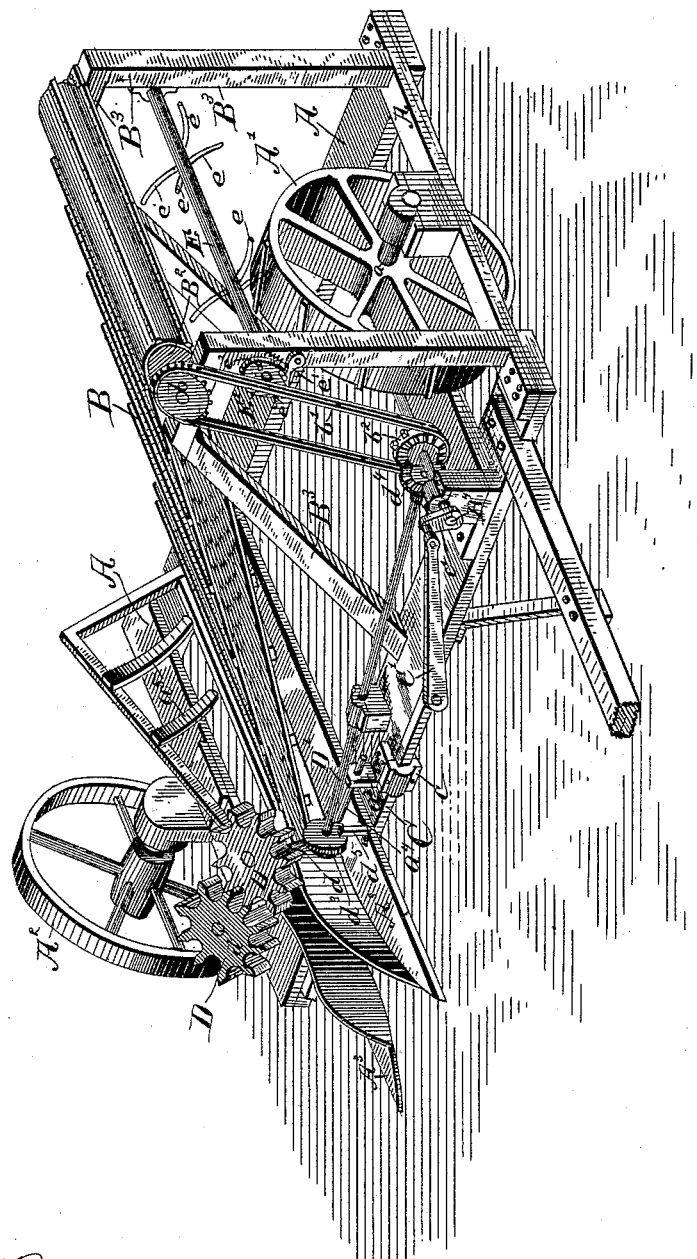
Figure 2:
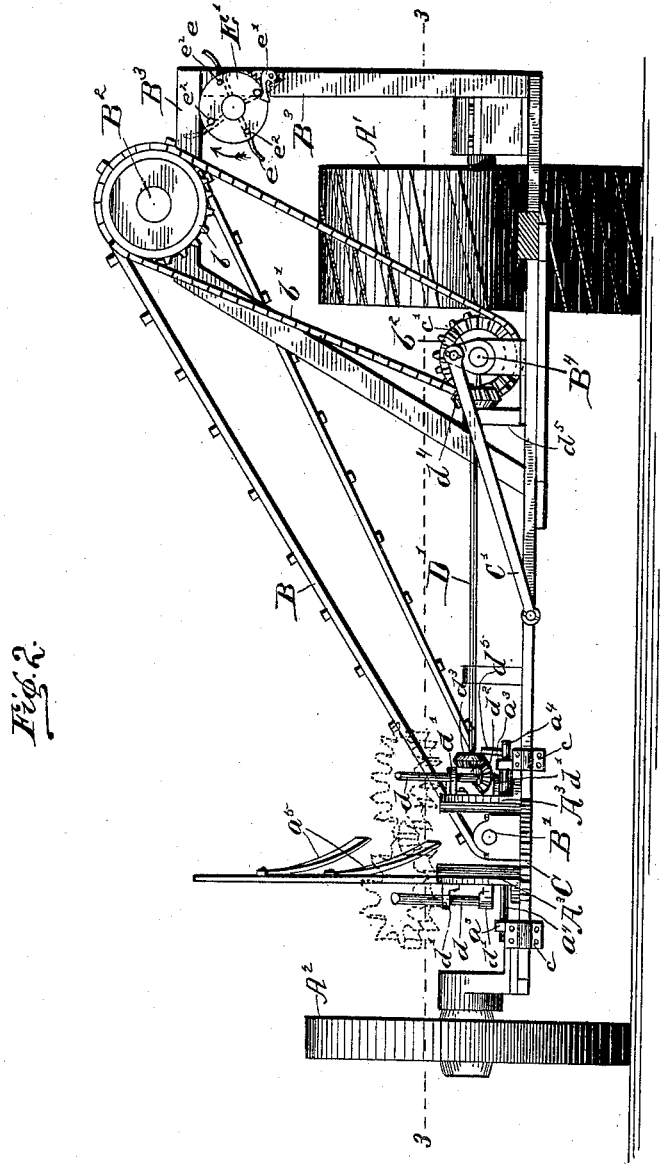
Figure 3:
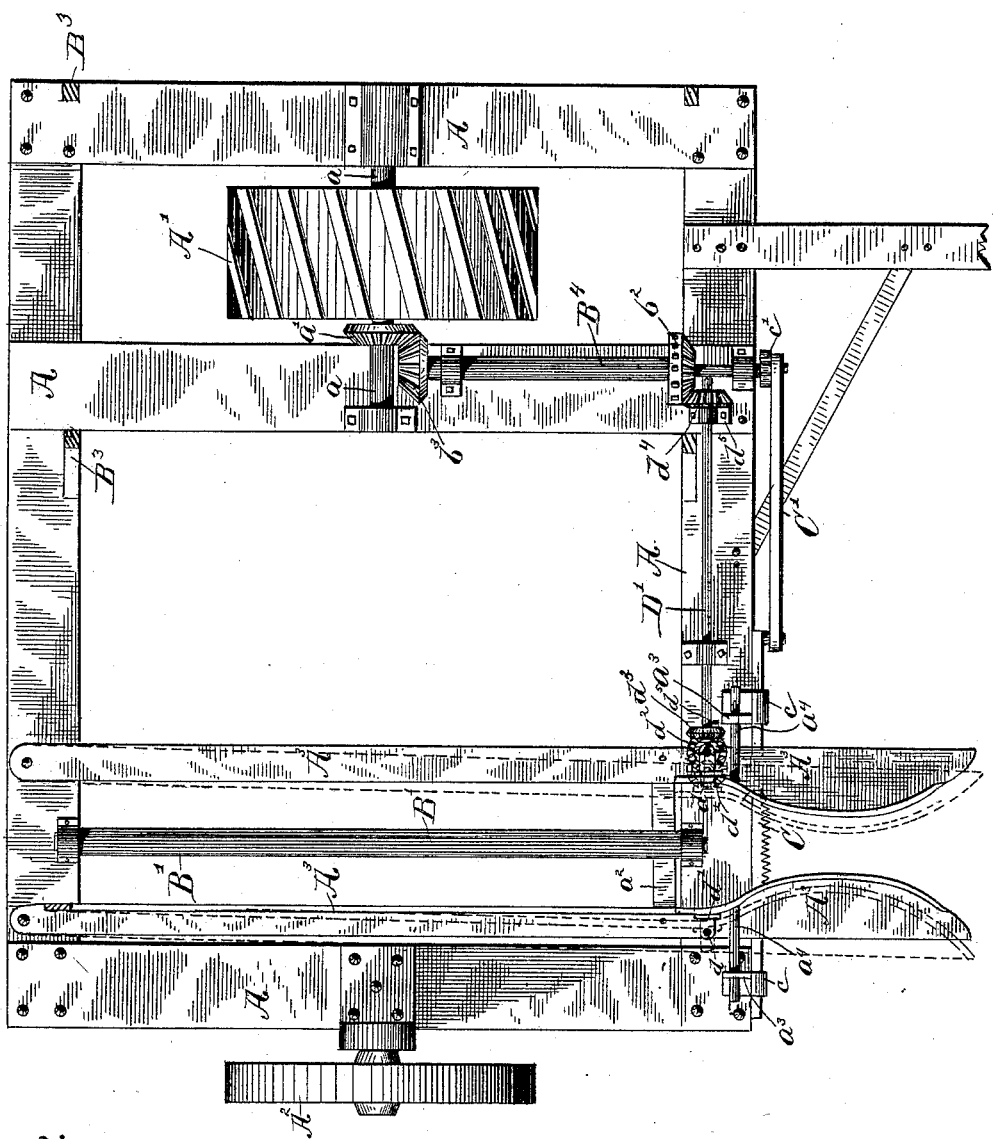

Referring to the accompanying drawings, which are made a part hereof, and on which similar letters of reference indicate similar parts, Figure 1 is a perspective view of a machine constructed in accordance with my invention; Fig. 2, a front elevation; Fig. 3, a horizontal section looking downwardly from the dotted line 3 3 in Fig. 2; Fig. 4, a detail view on an enlarged scale, similar to a portion of Fig. 3; Fig. 5, a sectional view showing the connection between the wheel $d^4$ and the shaft on which it is mounted, and Fig. 6 an enlarged view of the governing mechanism of the buncher.

In said drawings the portion marked A represents the frame-work of the machine; B, a carrier-apron; C, a knife; D, gathering and supporting wheels, and E a device for bunching the stalks.

The frame-work A is any suitable frame-work for the purpose, being preferably rectangular in form, as shown, and is supported on suitable wheels A' and $A^2$, as shown. Said wheel A' is a big "harvester" driving-wheel and is secured on the shaft $a$, suitably journaled in bearings on the frame-work, said shaft being provided with a miter gear-wheel $a'$, by which motion may be transmitted to the driving mechanism. The wheel $A^2$ is of a common form, suitably journaled on the opposite side of the frame-work for the purpose of supporting it. Two guide-bars $A^3$ are pivoted to the rear side of the frame-work and extend across said frame and out a short distance beyond its front side, being formed with outwardly curved or slanting adjacent ends or noses, which are arranged to pass on each side of the row of corn or other product and guide the stalks to the gathering-wheels, as will be presently described. They are connected near their front ends by a cross-bar $a^2$, and guides or stops $a^3$ are secured on the frame A a suitable distance from each bar to limit their vibratory motion, guide-pins $a^4$ being secured to said bars and mounted in perforations in said stops for the purpose of guiding and holding these ends in position. The outside one of said bars is also preferably provided with a frame projecting upwardly and having a series of guide-arms $a^5$ extending down therefrom to direct the stalks onto the apron as they come from the gathering-wheel.

The apron B is mounted on a roller B', journaled on one side of the frame-work, and extends upward and to the other side of the frame-work, where it is mounted on another roller or cylinder $B^2$, suitably journaled in bearings on the top of the brackets $B^3$, secured to the ends of the frame-work on this side of the machine for this purpose. Said apron is driven by means of a sprocket-wheel $b$, secured on one end of the shaft of this roller and connected by means of a chain belt $b'$ to a similar sprocket-wheel $b^2$ on the end of the shaft $B^4$, which is journaled in bearings on one portion of the frame-work and extends back to the shaft $a$, where it is provided with a miter gear-wheel $b^3$, arranged to mesh with the miter gear-wheel $a'$ on said shaft.

The knife C is mounted on the front part of the frame-work in guides $c$, secured to said frame-work, in which said knife reciprocates, it being driven by means of a pitman-rod C', connected thereto at one end and to a crank-arm $c'$ on the end of the shaft $B^4$ at the other end. Said knife is preferably of the form shown, being provided with a "saw-tooth" edge, which is most suitable for cutting this kind of produce.

The gathering-wheels D are mounted on the top end of short shafts $d$, which are journaled, preferably, with a slight incline, as shown, in suitable bearings $d'$, secured to upwardly-projecting parts on the front end of the pivoted or vibrating guide-bars $A^3$. Their edges are formed cogged, as shown, the cogs of each wheel being arranged to mesh with the other, and the spaces between the cogs being formed considerably wider and deeper than the cogs, which in operation only touch for a short distance back of their points.

The shaft of that wheel nearest the driving-shaft $B^4$ is provided with a miter gear-wheel $d^2$, which meshes with a similar wheel $d^3$ on the end of a shaft $D'$, which is journaled in suitable bearings on the front part of the frame-work and extends across to said driving-shaft, to which it is geared by means of the miter gear-wheel $d^4$, which meshes with a miter gear-face on the sprocket-wheel $b^2$, as shown. In order to permit the vibratory motion of the bars $A^3$, the gear-wheel $d^4$ is secured on the shaft $D'$ by a spline $s$, and said shaft is thus permitted to slide as said bars move, the gear-wheels $d^3$ and $d^4$ being held in gear with the wheels $d^2$ and $b^2$, respectively, by means of fingers or blocks $d^5$, extending up from the bar $A^3$ alongside said wheel $d^3$ and from the frame alongside said wheel $d^4$ to hold them in position. In the principal views this shaft $D'$ has its bearing at one end in the block which holds the wheel $d^4$; but in Fig. 5 this bearing is shown as a separate block a short distance behind the finger which extends up from the frame and rests against said wheel.

The bunching device E consists of a shaft journaled in suitable bearings in the brackets $B^3$ directly under the discharge end of the apron, provided with a series of double curved arms or fingers $e$, projecting from each side thereof to catch the stalks as they fall from said apron. A spring cam-faced pawl $e'$ is secured to the side of said brackets and arranged to engage with the projecting pins $e^2$ on the disk $E'$ on the forward end of said shaft, the engaging-surface of said pawl being of a cam formation and arranged in such a position as to be overcome and released when a certain amount of weight has been deposited on the curved projecting arms, as will be presently described.

The operation of my invention is as follows: The machine being constructed as described and put in shape for operation, a team is attached and the machine driven so that the row of corn or other products will come between the projecting points of the guide-bars $A^3$, which guide it back to the gathering-wheels D, which gather said product between the cogs and carry it back and force it against the knife C until it is cut and then deposit it upon the lower end of the apron B, onto which it is properly guided by means of the downwardly-projecting guides $a^5$, as before indicated. It is then carried by means of this apron up over the tail end thereof and deposited on the outwardly-projecting arms of the bunching device until a load has been deposited thereon of sufficient weight to overcome the strength of the spring by which the pawl is secured, the arms operating as a lever under the weight of the bunch to force the cam-face of the pawl to slip over the pin with which it is engaged, thus releasing said pawl and permitting the bunch of stalks to be dropped upon the ground in a convenient position for binding, the pawl engaging with the next pin on said wheel and holding it in position, so that the next series of fingers or arms will receive the next discharge from the apron until the desired load has been received. It will be understood, of course, that the tension of the spring which holds the pawl may be varied, and thus the size of the bundle varied in accordance with the demand of the work being performed. The bars $A^3$, being pivoted, permit a vibratory motion sufficient to compensate for the sidewise movement of the machine consequent upon the usually somewhat uneven movement of the team, and also the occasionally varying relative positions of the stalks of corn or other grain in the rows. The gathering-wheels, being mounted upon these arms, partake of this movement, which is a necessary one to the perfect operation of the machine.

Having thus fully described my said invention, what I claim as new, and desire to secure by Letters Patent, is—

1. The combination, in a corn and cane cutter, with the cutting mechanism, of vibratile bars $A^3$ and gathering-wheels mounted thereon, substantially as set forth.

2. The combination, in a corn and cane cutter, of gathering-wheels having upright shafts mounted on laterally-movable parts, a horizontal shaft movable longitudinally and geared to said upright shaft, a driving gear-wheel for the horizontal shaft, said shaft moving longitudinally through said gear-wheel and splined thereon, and fingers or stops by which said wheel is prevented from participating in said movement of the shaft.

3. The combination, in a corn and cane cutter and buncher, of the cutting-knife, the vibratile connected bars $A^3$, the gathering-wheels mounted thereon, the guiding-arms $a^5$, the carrier-apron, and the automatic buncher and dropper, said several parts being arranged and operating substantially as set forth.

4. The combination, in a corn and cane cutter, of the cutting-knife, vibratile guide-bars $A^3$ above said knife, and a frame having guide-arms $a^5$, secured to one of said guide-bars, substantially as shown and described.

In witness whereof I have hereunto set my hand and seal, at Indianapolis, Indiana, this 21st day of June, A. D. 1888.

BENJAMIN G. SEVERANCE. [L. S.]

Witnesses:
E. W. BRADFORD,
F. W. WOOD.